United States Patent
Drake

[11] 4,025,493
[45] May 24, 1977

[54] POLYAMIDES AND POLYESTERS FROM PHENYL-SUBSTITUTED ALKANE DIOIC ACIDS

[75] Inventor: Charles A. Drake, Bartlesville, Okla.

[73] Assignee: Phillips Petroleum Company, Bartlesville, Okla.

[22] Filed: Sept. 29, 1975

[21] Appl. No.: 617,761

[52] U.S. Cl. .......................... 260/75 R; 260/78 R
[51] Int. Cl.² .................. C08G 63/18; C08G 69/26
[58] Field of Search ........................ 260/78 R, 75 R

[56] References Cited
UNITED STATES PATENTS

| | | | |
|---|---|---|---|
| 2,631,992 | 3/1953 | Speck | 260/78 R |
| 2,730,517 | 1/1956 | Vogel et al. | 260/75 R |
| 3,067,245 | 12/1962 | Rowland | 260/75 R X |
| 3,071,612 | 1/1963 | Nemec | 260/75 R X |
| 3,197,434 | 7/1965 | Preston et al. | 260/47 |
| 3,197,443 | 7/1965 | Pease | 260/78 |
| 3,197,444 | 7/1965 | Moody | 260/78 |
| 3,505,298 | 4/1970 | Davis et al. | 260/78 R |
| 3,616,313 | 10/1971 | Mersereau | 260/78.4 X |
| 3,678,102 | 7/1972 | Isard et al. | 260/78 R |

Primary Examiner—Donald E. Czaja
Assistant Examiner—S. M. Person

[57] ABSTRACT

Diacids having the formulae

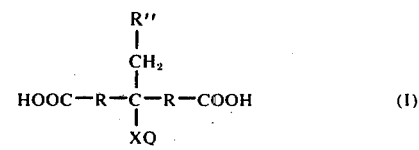

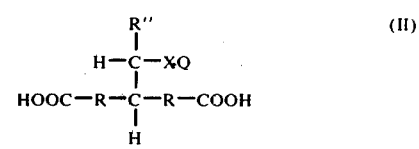

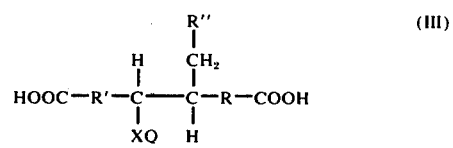

wherein the radicals R, which can be the same or different, are alkylene radicals having 1 to 16 carbon atoms per radical, R' is an alkylene radical $-C_nH_{2n}-$, $n$ being an integer from 0 to 15, with the further provision that there are at least 6 carbon atoms in the chain separating the two carboxyl groups $-COOH$, R'' is hydrogen or an alkyl radical having 1 to 6 carbon atoms per molecule; X is selected from the group of phenylene, naphthylene, cyclohexylene and decahydronaphthylene, Q is selected from the group of radicals consisting of hydrogen, halogen, alkyl, dialkylamino, alkoxide, hydroxy, alkylthio, and mercapto, which are useful precursors for diesters, polyamides and polyesters. The diesters are valuable plasticizers for PVC and the polyamides not having a crystalline melting point can be spun into fibers, which in turn can be used in the textile industry for making fabrics. Also disclosed are procedures to make the novel compounds.

7 Claims, No Drawings

POLYAMIDES AND POLYESTERS FROM PHENYL-SUBSTITUTED ALKANE DIOIC ACIDS

This invention relates to novel chemical compounds, as well as to methods of making them. In one aspect this invention relates to new dicarboxylic acids. In another aspect, this invention relates to novel diesters made from these dicarboxylic acids. In yet a further aspect, this invention relates to novel polyamides and polyesters. A further aspect of this invention is the production of polyamides an polyesters from the novel dicarboxylic acid.

BACKGROUND OF THE INVENTION

Dicarboxylic acids are well known in the art. These acids are precursors for polyamides and polyesters. Some of these polymers exhibit crystalline properties, or show what is called a crystalline melting point. Such polymers cannot be converted into thin flexible fibers useful for the textile industry. Therefore, it would be desirable to have dicarboxylic acids available that can be polymerized to form a polymer being non-crystalline, so that this polymer can be spun into fibers.

Furthermore, it would be desirable to have dicarboxylic acids available that can be readily converted into diesters. These diesters could be used for plasticizing poly(vinyl chloride).

THE INVENTION

It is the object of this invention to provide novel diacids.

Another object of this invention is to provide a process to make these diacids.

Still another object of this invention is to provide novel diesters.

A further object of this invention is to provide novel polymers, namely, novel polyamides and polyesters.

Still a further object of this invention is to provide a process to make these polymers.

These and other objects, advantages, embodiments, features and details of the invention will become apparent to those skilled in the art from the following detailed description thereof and the appended claims.

DIACIDS

In accordance with one aspect of this invention, there is provided novel diacids characterized by the formulae

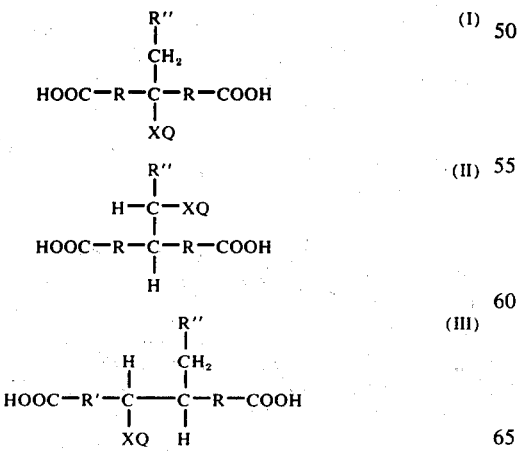

wherein the radicals R which can be the same or different are linear or branched alkylene radicals having 1 to 16 carbon atoms per radical, R' is an alkylene radical $-C_nH_{2n}-$, $n$ being an integer of 0 to 15, with the further provision for R and R' that there are at least 6 carbon atoms in the chain separating the two carboxyl groups; R'' is hydrogen or an alkyl radical having 1 to 6 carbon atoms; X is phenylene, naphthylene, cyclohexylene or decahydronaphthalene; Q is selected from the groups of radicals consisting of hydrogen (—H), halogen, alkyl ($C_tH_{2t+1}$), dialkylamino (—N ($C_tH_{2t+1})_2$), alkoxy (—O—$C_tH_{2t+1}$), hydroxy (—OH), alklthio (—S—$C_tH_{2t+1}$) or mercapto (—SH), wherein $t$ is an integer. In this definition of the diacids of this invention, R' in the molecule can be just a bond between the carbon atom of the carboxy group and the carbon atom to which —XQ is attached; this is what is meant when $n$ is zero. Since Q can be hydrogen, XQ encompasses, as preferred groups, unsubstituted phenyl and naphthyl radicals, as well as their hydrogenated counterpart cyclohexyl and decahydronaphthyl radicals.

More specifically, and in accordance with a further embodiment of this invention, the diacids are defined by the above given formulae with the further provision that R is a linear or branched alkylene radical with 1 to 8 carbon atoms per group; R' is a linear or branched alkylene radical as defined with $n$ being an integer from 0 to 7 R'' is hydrogen or a linear or branched alkyl radical with 1 to 4 carbon atoms per group; X is selected from the group of phenylene, naphthylene, cyclohexylene and decahydronaphthylene; the alkyl portions of Q contain 1 to 6 carbon atoms; the two carboxyl groups of the acids are separated by from 6 to 18 carbon atoms; the diacids of the formulae given above contain about 15 to about 40 carbon atoms per molecule, preferably 16 to 24 carbon atoms per molecule.

Examples of diacids defined in accordance with this invention by the formulae I, II and III are 4-methyl-4-phenyloctanedioic acid, 5-methyl-5-phenylnonanedioic acid, 2,4-dimethyl-4-phenyloctanedioic acid, 2,4,6-trimethyl-4-(3-chlorophenyl) octanedioic acid, 3-isopropyl-3-p-tolyldecanedioic acid, 5-ethyl-5-(4-dimethylaminophenyl)dodecanedioic acid, 3-methyl-3-(4-hydroxy-phenyl)nonanedioic acid, 5-n-butyl-5-(3-methylthiophenyl)decanedioic acid, 7-neopentyl-7-(2-mercaptophenyl)undecanedioic acid, 6-n-propyl-6-(2-naphthyl)-hexadecanedioic acid, 9-n-hexyl-9-(5-n-hexyl-1-naphthyl) eicosanedioic acid, and 5-methyl-5-cyclohexylnonanedioic acid.

PROCESS FOR THE PREPARATION OF THE DIACIDS

A further aspect of this invention relates to a process to prepare the diacids defined above. Broadly speaking, and in accordance with a further embodiment of this invention, this process comprises hydrolyzing the respective dinitriles.

More specifically, and in accordance with another embodiment of this invention, the diacids defined above in which X is phenylene or naphthylene are prepared by contacting at elevated temperatures either a strong mineral acid or a strong base with dinitriles having the formulae

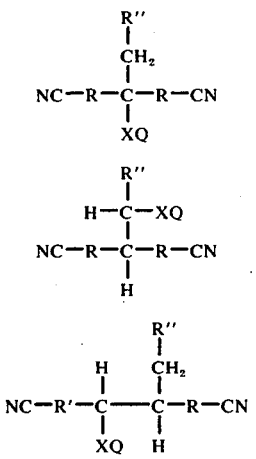

$$\text{NC}-\text{R}-\overset{\overset{\text{R}''}{|}}{\underset{\underset{\text{XQ}}{|}}{\text{C}}}-\text{R}-\text{CN} \quad \text{(IV)}$$

$$\text{NC}-\text{R}-\overset{\overset{\text{H}-\overset{\overset{\text{R}''}{|}}{\underset{|}{\text{C}}}-\text{XQ}}{|}}{\underset{\underset{\text{H}}{|}}{\text{C}}}-\text{R}-\text{CN} \quad \text{(V)}$$

$$\text{NC}-\text{R}'-\overset{\overset{\text{H}}{|}}{\underset{\underset{\text{XQ}}{|}}{\text{C}}}-\overset{\overset{\text{R}''}{|}\,\,\overset{\text{CH}_2}{|}}{\underset{\underset{\text{H}}{|}}{\text{C}}}-\text{R}-\text{CN} \quad \text{(VI)}$$

wherein X is phenylene or naphthylene, whereas the other letters R, R′, R″ and Q have the same meaning as defined above. The strong mineral acid is preferably selected from the group consisting of hydrochloric acid, sulfuric acid, nitric acid, and phosphoric acid. These acids are employed as concentrated aqueous solutions. The strong base is preferably selected from the group consisting of sodium hydroxide, potassium hydroxide, lithium hydroxide, calcium hydroxide, and magnesium hydroxide. These bases are employed as concentrated aqueous solutions.

In accordance with a further embodiment of this invention, those diacids defined above in formulae I to III in which X is cyclohexylene or decahydronaphthylene radical are prepared by the same process just described, namely, by the hydrolysis of the nitriles defined by formulae IV to VI (X being phenylene or naphthylene) and thereafter hydrogenating the aromatic double bonds in the diacids produced. This hydrogenation step is usually carried out by contacting the diacids defined and prepared as described above and having phenylene or naphthylene as the substituent simultaneously with hydrogen and a hydrogenation catalyst. For this hydrogenation step, every suitable hydrogenation catalyst can be employed that will reduce or hydrogenate a benzene or naphthalene ring, but not reduce a carboxylic acid group. Suitable and presently preferred are platinum-based catalysts such as platinum oxide, PtO₂, platinum metal and hydrogen-reducible compounds of platinum on suitable support materials such as carbon, alumina and the like. Several platinum-based hydrogenation catalysts are well known in the art and can be employed. The hydrogenation conditions preferably are: temperature of 25 to 150° C, H₂ pressure of up of 200 psig.

The dinitriles defined above by formulae IV or VI are prepared by an addition step. In this step an unsaturated dinitrile defined by the formulae

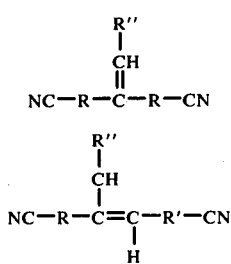

or a mixture of such dinitriles is reacted with a compound having the formula H-XQ, with the letters R, R′, R″, X and Q having the same meaning as defined above in connection with the formulae I to III, in the presence of a catalyst promoting the addition of the H-XQ compound to the olefinic unsaturation of the dinitriles defined above in formulae VII and VIII. The olefinically unsaturated dinitriles of formulae VII to VIII, in accordance with the preferred embodiment of this invention, are contacted with an aromatic compound having the formula H-XQ wherein X is a phenylene or naphthylene radical in the presence of a Lewis acid type catalyst. Examples for this catalyst are AlCl₃, BF₃, FeCl₃, ZnCl₂, SnCl₂, HF, HgCl₂, SbCl₅ and the like and mixtures thereof.

The particular reaction conditions for the addition reaction depend upon the nature of the reactants. If complexing groups are present, a sufficient excess of catalyst should be used to overcome the loss occurring by complex formation. The temperatures employed in this reaction conveniently are between room temperature and the boiling point of the lowest boiling reactant, preferably about 60° to 100° C. The pressures employed are not critical and can conveniently be near atmospheric pressure, though higher pressures can be employed, if desired, to maintain the reactants substantially in the liquid phase. Preferably. the Lewis acid is added to the solution of the aromatic compound and the unsaturated dinitrile.

Alternatively, and in accordance with a still further embodiment of this invention, the diacids defined above in formulae I to III are prepared by first hydrolyzing an unsaturated dinitrile having the formulae VII or VIII above to form olefinically unsaturated acids having the formulae

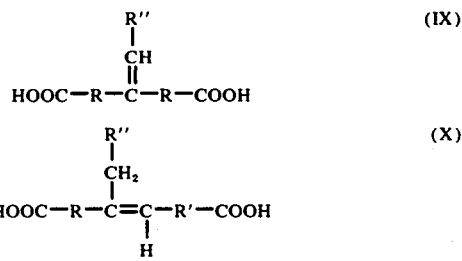

in which the letters R, R′ and R″ have the same meaning as above. These acids are then in a second step contacted and reacted with a compound having the formula H—XQ in the presence of an addition promoting catalyst. This catalyst again is preferably a Lewis acid type catalyst, examples of which have been given above. The hydrolysis step is carried out in the usual manner by reacting the unsaturated nitriles of the formulae VII and VIII with a strong mineral acid or a strong base. Examples for both the mineral acid and the base have been given above.

During the reaction of the olefinically unsaturated dinitriles of formulae VII and VIII or diacids of formulae IX and X, respectively, the Lewis acid promoted addition produces predominantly compounds of the formula I (after hydrolysis of the unsaturated dinitriles) in accordance with the Markownikoff rule. The anti-Markownikoff addition, in case of the starting material being either the dinitrile of formula VII or the diacid for formula IX, results in diacids of the formula II (eventually after hydrolysis of the unsaturated dinitrile). Correspondingly, the anti-Markownikoff addition of the compound H—XQ to the dinitriles of the formula VIII or to the diacids of formula X produces a diacid of the formula III (eventually after hydrolysis of the unsaturated dinitrile). In case a mixture of starting materials, e.g., a mixture of dinitriles of the formulae VII and VIII is used, a mixture of the diacids of formulae I, II and III is produced consisting predominantly of diacids of the formula I, and a small percentage of diacids of formulae II and III. The relative quantities of each one of these acids depend upon the ratio of the dinitriles in the starting mixture and the process conditions which influence Markownikoff versus anti-Markownikoff additions.

DIESTERS

In accordance with a still further embodiment of this invention, there are provided novel diesters. These diesters have the general formulae

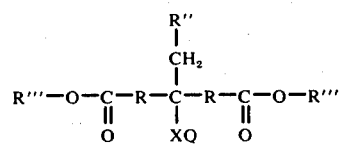 (XI)

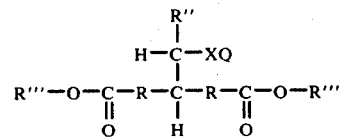 (XII)

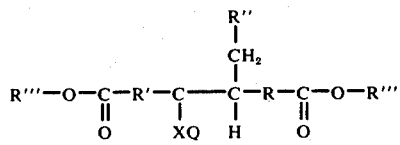 (XIII)

in which R, R', R", X and Q have the same meaning as defined above in connection with the diacids and in which the radicals R''', which can be the same or different, are individually selected from the group consisting of straight chain or branched alkyl radicals having 1 to 20 carbon atoms; preferably R''' is an alkyl radical having 4 to 12 carbon atoms. Most preferably R''' radicals are selected from the group consisting of hexyl ($C_6H_{13}$—), octyl ($C_8H_{17}$—) and decyl ($C_{10}H_{21}$—) radicals and mixtures thereof.

These diesters can be used as plasticizers for poly(vinyl chloride). Furthermore, the diesters defined are useful as synthetic lubricants.

The diesters of this invention can be prepared by reacting the diacid defined above with the alcohol R'''λ 'or alcohol mixture providing the desired radical or radicals R'''. The alcohol R'''OH is preferably used in excess of the stoichiometric amount; thus, e.g., 3 mols of alcohol per mol of diacid can be employed. The reaction is carried out under ester forming conditions. These conditions usually include the presence of a catalyst, such as a small amount of a concentrated strong mineral acid, e.g., hydrochloric acid, sulfuric acid, nitric acid or phosphoric acid, and the application of heat.

POLYMERS

Another embodiment of this invention consists in novel polymers. The polymers, namely polyamides and polyesters, consist essentially of repeating units of the formula

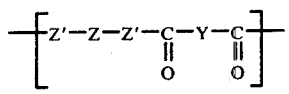 (XIV)

in which Y is individually selected from the group consisting of

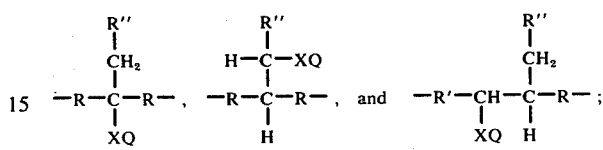

Z' is —O— or 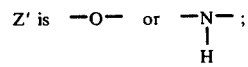

Z is a divalent radical individually selected from the group of substituted or unsubstituted alkylene, cycloalkylene, arylene, alklarylene, alkylenearylene, alkylcyloalkylene, alkylenecycloalkylene and cycloalkylenearylene radicals having 2 to 20 carbon atoms per radical Z; and wherein R, R', R", Q, X and n have the same meaning as defined above in connection with the diacids of this invention. These polymers contain several of such groupings of formula XIV, so that their molecular weight preferably is in the range of about 10,000 to about 500,000.

PRODUCTION OF POLYAMIDES

The novel diacids of this invention alone or in admixture with other diacids can be reacted with primary diamines to produce polyamides in accordance with formula XIV in which Z' is

Examples for other diacids which could be used in addition to the diacids of this invention are adipic acid, terephthalic acid, sebacic acid, isophthalic acid, cyclohexane-1,4-dicarboxylic acid and the like. Suitable diamines which can be used in the preparation of the polyamides are acyclic, alicyclic, or aromatic diamines. Examples for such diamines are hexamethylenediamine, 1,9-nonanediamine, 1,12-dodecanediamine, 5-methyl-1,9-nonanediamine, 5-methyl-5-phenyl-1,9-nonanediamine, 4,4'-bicyclohexyldiamine, bis(4-aminocyclohexyl)methane, 2,2-bis(4-aminocyclohexyl)-propane, p-phenylenediamine, p,p-methylenedianiline and the like and mixtures thereof. The diamines used generally contain about 6 to about 15 carbon atoms per molecule.

The amide-forming reaction between at least one diacid of the formulae I to III given above and at least one diamine is carried out by heating the reaction mixture. This is preferably done in an inert atmosphere such as a nitrogen atmosphere and in a stirred or unstirred reactor. Pressures of about 0 to about 600 psig and temperatures of about 75° to 350° C, as well as reaction times between 0.5 and 12 hours are the preferred reaction conditions. The reaction mixture preferably is maintained at maximum temperature reached over an additional period of time such as 0.5 to several hours, for example, for 2 hours, in order to complete polymerization and to improve the properties of the polyamide. The polymeric product is further improved by maintaining the reaction mixture under an inert atmosphere at a pressure of from 1 atmosphere to a very high vacuum for an additional interval to further remove gaseous products, as well as water. In order to avoid crosslinking, a slight excess such as about 2 mol percent of diamine can be employed relative to the amount of the dicarboxylic acid.

Polycarboxylic acids with 3 to 6 carboxyl groups per molecule and/or polyamines with 3 to 6 amino groups per molecule can be used as modifying agents, preferably in small amounts of about 0.1 to 5 mol % of the total monomers, in the polymerization mixture to produce polyamides with special properties. Benzenetricarboxylic acid and 1,3,5-triaminopentane are examples for such modifying agents.

PRODUCTION OF POLYESTERS

Furthermore, the diacids as defined above by formulae I to III can be used either alone or together with other diacids to produce polyesters of formula XIV in which Z' is —O—. These diacids in this embodiment are reacted with polyols, preferably with diols, to produce the polyesters. Examples of other diacids which can be used together with the diacids defined above in formulae I to III are straight or branched chain dicarboxylic acids having 6 to 16 carbon atoms such as terephthalic acid, adipic acid, sebacic acid, isophthalic acid, cyclohexane-1,4-dicarboxylic acid and the like. The diols used in the preparation of polyesters preferably have 2 to 16 carbon atoms. Examples for such diols that can be used for the production of polyesters from the diacids of this invention are ethylene glycol, 1,2-propanediol, 1,3-propanediol, 2,2-dimethylpropane-1,3-diol, 1,6-hexanediol, 1,4-cyclohexanediol, 1,4-cyclohexanedimethanol, hydroquinone, 4,4'-biphenyldimethanol, 4,4'-isopropylidenediphenol and the like and mixtures thereof.

Polycarboxylic acids with 3 to 6 carboxyl groups per molecule, as well as polyols with 3 to 6 hydroxy groups per molecule, can be used preferably in small percentages relative to the diols in the production of the polyesters in order to produce polyesters with special properties. The concentration of these polycarboxylic acids and/or polyols is preferably 0.1 to 5 mol % of the total monomers. An example for a tricarboxylic acid useful for such purposes is benzene tricarboxylic acid. An example for a triol that can be used is glycerol.

The production conditions for the preparation of the polyesters include an inert atmosphere such as a nitrogen atmosphere. The reaction is carried out in a stirred or unstirred reactor at elevated temperature, generally with continuous removal of water. A generally useful range for the temperature will be 125° to 275° C. The pressure of the reaction can be varied in broad ranges and will generally be within 0 to 600 psig. The reaction is preferably carried out with a small excess of, e.g., 10–20 mol % of the diols with respect to the diacids.

Catalysts such as sulfonic acids, antimony pentafluoride, phosphoric acid, titanium alkoxides, dialkyltin oxides and the like can be employed if desired during the polymerization.

The definitions for the various substituents and groupings given above, as well as their preferred subgenus or species apply to the diacids, as well as to the diesters, polyamides, polyesters and the various methods to make these compounds unless otherwise specified.

The invention will still be more fully understood from the following detailed examples which are intended to illustrate still more preferred embodiments of the invention, not to limit same.

EXAMPLE I

Preparation of the Unsaturated Dinitrile

A mixture of unsaturated dinitriles was produced essentially as described in the U.S. Pat. No. 3,840,583, Example IV. The product mixture was distilled to give a purified product mixture containing approximately 54 weight percent 5-methylene-1,9-nonanedinitrile, 36 weight percent 5-methyl-4-nonene-1,9-dinitrile, 6 weight percent 2-methyl-4-methylene-1,8-octanedinitrile, 2 weight percent 2,4-dimethyl-3-octene-1,8-dinitrile, 2 weight percent 2,4-dimethyl-4-octene-1,8-dinitrile and minor amounts of other isomers.

Preparation of the Phenyl-Substituted Dinitrile

In a 2-liter reactor, 105 gm of the above-described purified mixture of unsaturated dinitriles and 1200 ml of benzene were mixed. Aluminum choride (240 gm) was added slowly over a 30-minute period to the vigourously stirred solution. Following aluminum chloride addition, the reaction mixture was heated at 80° C for 2 hours. The reaction mixture was poured into an ice-water mixture which was then extracted with benzene. The benzene extract was then washed with water, dried over anhydrous magnesium sulfate and distilled. A mixture containing approximately 90 weight percent 5-methyl-5-phenyl-1,9-nonanedinitrile, 10 weight percent 2,4-dimethyl-4-phenyl-1,8-octanedinitrile and minor amounts of other isomers was obtained in 83 percent of theoretical yield.

Preparation of the Dicarboxylic Acid

120 Grams of the product prepared in accordance with the previous procedure and being a dinitrile mixture consisting essentially of 90 weight percent 5-methyl-5-phenylnonanedinitrile and 10 weight percent 2,4-dimethyl-4-phenyloctanedinitrile, as well as 160 grams potassium hydroxide were charged into a 1-liter glass reactor containing 670 grams of ethylene glycol. The mixture was stirred and heated to 160° C until the ammonia evolution ceased, after which the heating was continued for 2 additional hours. After cooling, the resulting mixture was acidified with hydrochloric acid while cooling by addition of ice. The reaction mixture was extracted with ether. The ether extract was washed with water. The ether was evaporated. 136 Grams of solid material were produced thereby. This solid material was recrystallized twice from hot benzene. 126 Grams (91 percent of theoretical maximum yield) of the solid material was thereby produced. The solid material produced consisted of 90 weight percent 5-methyl-5-phenylnonanedioic acid and 10 weight percent 2,4-dimethyl-4-phenyloctanedioic acid. The melting point of the mixture produced was 136° to 138° C. The elemental analysis for the mixture was:

Calculated for $C_{16}H_{22}O_4$: Percent C 69.1, Percent H 7.9;

Found: Percent C 69.0, Percent H 7.9.

The mixture prepared in accordance with this example for the following examples is referred to as PMHD.

EXAMPLE II

Diesters of PMHD and Mixed $C_6$, $C_8$ and $C_{10}$ Alcohols

In a 500-ml reactor were placed 139 gm PMHD, 150 gm of a mixture containing 20 weight percent 1-hexanol, 37 weight percent 1-octanol and 43 weight percent 1-decanol (alcohol mixture was Alfol 610 from Conoco) and 0.5 ml concentrated sulfuric acid. The mixture was heated at 160°–170° C until 95% of the theoretical amount of water (17 ml) was removed overhead. The mixture was cooled to 100° C and washed twice with 150-ml portions of 5 weight percent aqueous sodium hydroxide and thrice with 150-ml portions of distilled water. The washed reaction mixture was steam stripped to remove unreacted alcohol. The product was stirred at 80° C with anhydrous magnesium sulfate, charcoal and diatomaceous earth and then filtered. After heating the product to 145° C at 0.5 torr to remove volatiles, 245 gm of mixed diesters of PMHD was recovered.

The above-described mixture of diesters of PMHD was employed as a plasticizer for poly(vinyl chloride). A formulation was prepared according to the following recipe:

| Recipe | Parts by Weight |
| --- | --- |
| Poly(vinyl chloride) | 100 |
| PMHD esters | 50 |
| Dibutyltin bis(isooctyl thioglycolate) | 2 |
| Epoxidized soybean oil | 1 |
| Stearic acid | 0.03 |

The above mixture of ingredients was dumped on a hot (160° C) 6 × 13″ roll mill and milled for 5 minutes. Sheets of the plasticized poly(vinyl chloride) were molded in a hydraulic press at 171° C. Properties recorded in the following table were measured on the finished sheets which had been previously conditioned for at least 48 hours at 23° C and 50 percent relative humidity according to ASTM procedure D618–61.

Properties of Plasticized PVC

| | |
| --- | --- |
| Hardness, Shore A[a], Initial | 93 |
| Hardness, Shore A, 10 sec. | 88 |
| Tensile, psi[b] | 2666 |
| Elongation, percent[b] | 335 |
| 100% Modulus, psi[b] | 1686 |
| A.C. Volatility, % loss[c] | 1.44 |
| S.W. Extraction, % loss[d] | 2.41 |
| M.O. Extraction, % loss[e] | 18.07 |
| Brittleness temp., ° C[f] | −45 |
| Clash-Berg temp., ° C[g] | −29 |

[a]ASTM D1706-61
[b]ASTM D414
[c]Activated carbon volatility, ASTM D1203-61T
[d]Soapy water extraction, ASTM D543-60T
[e]Mineral oil extraction, ASTM D543-60T
[f]ASTM D746
[g]ASTM D1043

The above data illustrate the utility of the mixed esters of PMHD as a plasticizer for poly(vinyl chloride).

EXAMPLE III

Polyamide from PMHD and Hexamethylenediamine

In this example, polyamide was prepared from the dicarboxylic acid mixture prepared in accordance with Example I. Into a glass reactor 5.5598 grams of PMHD and 2.3241 grams of hexamethylenediamine were added. The reactor was flushed with nitrogen and sealed under 15 psig nitrogen pressure. The reactor was then immersed into a Woods metal bath at 120° C. The pressure was maintained at 15 to 20 psig by intermittent venting as needed. The temperature was raised to 210° C over 1 hour and the temperature was maintained at that value for 1 hour. Then the temperature was raised to 300° C over ½ hour and maintained at the value for 1 hour. The pressure in the reactor was then reduced to atmospheric pressure. The reactor was maintained at 300° C for an additional hour with a nitrogen bleed through the system. Then the pressure in the reactor was reduced to 20 torr. Heating at 300° C was continued for an additional hour with a nitrogen bleed. After nitrogen was added to reestablish atmospheric pressure, the bath was removed and the system was allowed to cool with a slow nitrogen bleed. The resulting clear, tough polyamide exhibited an inherent viscosity (0.5 gram polyamide in 100 ml m-cresol at 30° C) of 1.02, a glass transition temperature at 74° C by differential thermal analysis and a polymer melt temperature (hot bar determination) of 238° C. No crystalline melting point was observed by differential thermal analysis.

EXAMPLE IV

Polyamide from PMHD and 1,12-Dodecanediamine

Example III was essentially repeated using, however, 4.008 g 1,12-dodecanediamine instead of the hexamethylenediamine. Furthermore, the system was heated for ½ hour from 120° to 210° C instead of 1 hour. The clear polyamide produced exhibited an inherent viscosity of 1.2, a glass transition temperature of 72° C and a polymer melt temperature of 117° C. Again, no crystalline melting point was observed by differential thermal analysis.

EXAMPLE V

Polyamide from PMHD and 2,2-bis(4-Aminocyclohexyl)propane

Example III was essentially repeated using, however, 4.7686 g 2,2-bis(4-aminocyclohexyl)propane instead of the hexamethylenediamine. The maximum temperature in this example was 320° C instead of 300° C. The resulting polyamide exhibited an inherent viscosity of 0.72, a glass transition temperature of 174° C, a polymer melt temperature of 238° C and no observable crystalline melting point.

EXAMPLE VI

Polyamide from PMHD and 5-Methyl-1,9-nonanediamine

Example III was again essentially repeated utilizing, however, instead of the hexamethylenediamine, a mixture consisting of approximately 90 weight percent 5-methyl-1,9-nonanediamine and 10 weight percent 2,4-dimethyl-1,8-octanediamine; this mixtue is referred to as MND in the following. MND was prepared from an unsaturated dinitrile mixture such as described in Example I by catalytic hydrogenation as described in U.S. Pat. No. 3,880,928 and 3,880,929. 3.4456 Grams MND were used in place of the hexamethylenediamine. The polyamide produced exhibited an inherent viscosity of 0.97, a glass transition temperature of 59° C, a polymer melting point of 126° C, and no observable crystalline melting point.

EXAMPLE VII

Polyamide from PMHD and PMND

Example III was essentially repeated utilizing, however, 4,9638 g of PMND (a mixture consisting of 90 weight percent 5-methyl-5-phenyl-1,9-nonanediamine and 10 weight percent 2,4-dimethyl-4-phenyl-1,8-octanediamine) instead of the hexamethylenediamine used in Example III. PMND was prepared by catalytic hydrogenation of a mixture of phenyl-substituted dinitriles such as is described in Example I. The polymer produced was a clear polymaide exhibiting an inherent viscosity of 0.79, a glass transition temperature of 79° C, a polymer melting point of 145° C, and no observable crystalline melting point.

EXAMPLE VIII

Polyamide from PMHD, Adipic Acid and 2,2-bis(4-Aminocyclohexyl)propane

Into a 1-liter stainless steel reactor, 58.38 g PMHD, 83.44 g 2,2-bis(4-aminocyclohexyl)propane, 20.45 g adipic acid and 40 g distilled water were charged. The charge thus contained the two acids PMHD and adipic acid in a molar ratio of 60 to 40. The reactor was flushed with nitrogen, sealed and pressured to 60 psig with nitrogen. The system was heated to 210° C over 50 minutes while the pressure reached 140 psig. The temperature of 210° C was maintained in the system for an additional hour while the pressure rose to 170 psig. Thereafter, the system was heated to 210° C over 45 minutes and vented sufficiently to maintain 500 psig pressure. The temperature of 310° C was maintained for an additional hour. Then the system was vented over a 30-minute period until it reached atmospheric pressure. The system then was maintained at the atmospheric pressure and at 310° C for 30 minutes. Vacuum thereafter was applied to the reactor reducing the pressure therein to 20 torr over 30 minutes. The conditions of 20 torr pressure and 310° C temperature were maintained for 1-½ hours. Thereafter, the product was blown down under 200 psig pressure into a tiny extrudate. The resulting polymer exhibited an inherent viscosity of 0.73 with a polymer melting temperature of 245° C. For this polymer, too, no crystalline melting point could be observed. The following properties were measured on the polyamide:

| Property | ASTM Method | Result |
|---|---|---|
| Density gm/cc | | 1.0764 |
| Flexural modulus, psi X $10^{-3}$ | D790-66 | 351 |
| Tensile yield, psi | D638-68 | 11,150 |
| Elongation, % | D638-68 | 10 |
| Izod impact, ft. lbs/in. notch | D256-56 | 0.35 |
| Heat distortion, F | D648-56 | 320 |
| Hardness, Shore D | D2240-68 | 87 |

The polyamides produced in accordance with the Examples III to VIII were all amorphous. That means the polymers were all clear, transparent and no crystalline melting point could be observed.

EXAMPLE IX

Polyester from PMHD and 1,4-Butanediol

In this calculated example, 27.8 g of PMHD and 10.4 g of 1,4-butanediol are introduced into a reactor. Over a period of 1 hour the temperature is gradually raised to 220° C. Water formed by the esterification reaction is removed overhead. The temperature is maintained at 220° C for 1 additional hour until the evolution of water subsides. The temperature is increased to 250° C over the period of 1 hour while the pressure over the reaction mixture is simultaneously reduced to 1 torr. The system is maintained at 250° C and 1 torr for one additional hour during which dry nitrogen is slowly bubbled through the polymer melt. After cooling to room temperature, 36.8 gm of polyester is recovered.

Reasonable variations and modifications, which will be apparent to those skilled in the art, can be made in this invention without departing from the spirit and scope thereof.

I claim:

1. A polymer defined by having repeating units

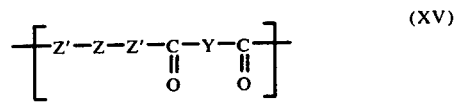

wherein Y is individually selected from the group consisting of

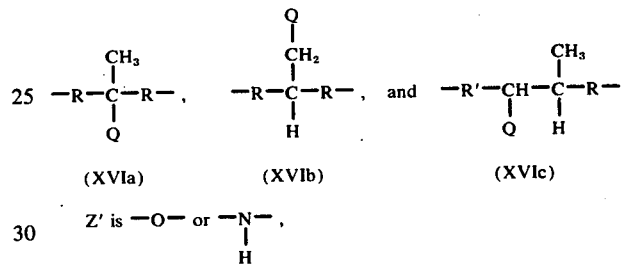

Z' is —O— or —N—,
          |
          H

Z is a divalent radical individually selected from the group of substituted or unsubstituted alkylene, cycloalkylene, arylene, alkylarylene, alkylenearylene, alkylcycloalkylene, alkylenecycloalkylene and cycloalkylenearylene radicals having 2 to 20 carbon atoms per radical, and wherein R is n-propylene, R' is ethylene, and Q is phenyl.

2. A process for preparing polymers in accordance with claim 1 comprising reacting at least one compound having the formula

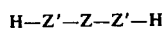

with an acid consisting essentially of a major portion of 5-methyl-5-phenyl nonane-1,9-dioic acid and a minor portion of 2,4-dimethyl-4-phenyloctane-1,8-dioic acid.

3. A process in accordance with claim 2 wherein at least one diamine having 6 to 15 carbon atoms per molecule is reacted with said diacids.

4. A process in accordance with claim 3 wherein a dicarboxylic acid consisting essentially of 5-methyl-5-phenyl-1,9-nonanedioic acid is reacted with a diamine having 6 to 15 carbon atoms per molecule such as to form a polyamide.

5. A polymer in accordance with claim 1 wherein Z contains 6 to 15 carbon atoms per radical.

6. A polymer in accordance with claim 1 wherein Z' is

7. A process in accordance with claim 2 in which at least one dialcohol having 2 to 16 carbon atoms per molecule is reacted with said dicarboxylic acid under polyester forming conditions.

* * * * *